Patented Dec. 15, 1925.

1,565,344

UNITED STATES PATENT OFFICE.

BARTHOLOMÄUS VOSSEN, OF HOCHST-ON-THE-MAIN, GERMANY, ASSIGNOR, BY MESNE ASSIGNMENTS, TO GRASSELLI DYESTUFF CORPORATION, OF NEW YORK, N. Y., A CORPORATION OF DELAWARE.

BROWN TRISAZO DYESTUFFS AND PROCESS OF MAKING SAME.

No Drawing.     Application filed December 17, 1924. Serial No. 756,550.

*To all whom it may concern:*

Be it known that I, BARTHOLOMÄUS VOSSEN, a citizen of Germany, residing at Hochst-on-the-Main, Germany, have invented certain new and useful Improvements in Brown Trisazo Dyestuffs and Processes of Making Same, of which the following is a specification.

The only way for obtaining by means of acid azodyestuffs deep reddish to olive-brown dyeings on leather prepared by the various tanning-processes has hitherto, in almost all cases, been to attain the desired tints by mixing several dyestuffs. It is a well known fact that such dyestuff-mixtures entail various drawbacks because the several dyestuffs have as a rule a different affinity for the material to be dyed so that they are apt to give uneven dyeings; moreover when using mixtures it is very difficult to secure always one and the same tint. In particular no deep-brown dyestuff for dyeing leather has hitherto been known which constituted a uniform chemical body and consequently did not show the disadvantages of the dyestuff-mixtures.

Now I have found that valuable, uniform brown dyestuffs especially adapted for leather-dyeing are obtained by preparing mono-azodyestuffs from diazotized amines or their substitution products with resorcinol or its substitution products, especially chloro-resorcine, 1.3.4-resorcylic acid or the like and then coupling with a diazotized aminonaphthol or its substitution products and finally causing diazotized amines or their substitution products to act upon them.

The synthesis of the dyestuffs in question may be explained by the following scheme:

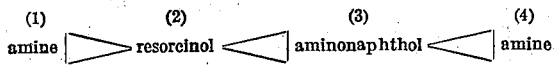

or their substitiution products.

By amines and phenols I understand in the description and claims amino- and hydroxy-compounds, substituted or not, above all, of course, such of the benzene- or naphthalene series, and by aminophenols I understand not only the simple aminophenols but also their substitution products. By resorcinol I understand resorcinol or its substitution products (including homologues). The most important components for the above stated combination are for instance in the initial position (1) sulfanilic acid or its substitution products or picramic acid; in the position denoted with (2): resorcinol or its substitution products (other than the sulfonic acids); in the position denoted with (3): 1-amino-8-hydroxynaphthalene-3-6-disulfonic acid, 1-amino-8-hydroxynaphthalene-4-6-disulfonic acid, 2-amino-8-hydroxynaphthalene-6-sulfonic acid, 2-amino-5-hydroxynaphthalene-7-sulfonic acid, 1-amino-8-hydroxynapthalene-4-sulfonic acid or the like and in the final position (4): unsulfonated nitro- or halogensubstituted arylamines. By a suitable selection of the several components in the above stated scheme the most varied shades, from olive-brown to reddish-brown, may be obtained.

The dyestuffs possess excellent properties as to fastness, particularly an excellent fastness to light, they give even tints, are also readily soluble and the dye-bath is exhausted very well. The tints obtainable thereby are of surprising beauty.

The following examples illustrate my invention:

1. *Dark-brown for leather.*

17,3 kilos of sulfanilic acid are diazotized in the usual manner and coupled with 11,0 kilos of resorcinol dissolved with 8,0 kilos of caustic soda solution. The whole is stirred for 5 hours and then there is slowly added in the usual manner the diazo compound from 23,9 kilos of 1-amino-8-naphthol-4-sulphonic acid. After the coupling is finished the acetic acid diazo compound of 13,8 kilos of 4-nitro-1-diazobenzene is added to the diazodyestuff. After the coupling is complete, the dyestuff is salted out in the usual manner.

Thus there is obtained with a good yield a dyestuff which gives on chrome leather, or on leather tanned with a vegetable agent, a yellowish dark-brown tint. The dyestuff has the following formula:

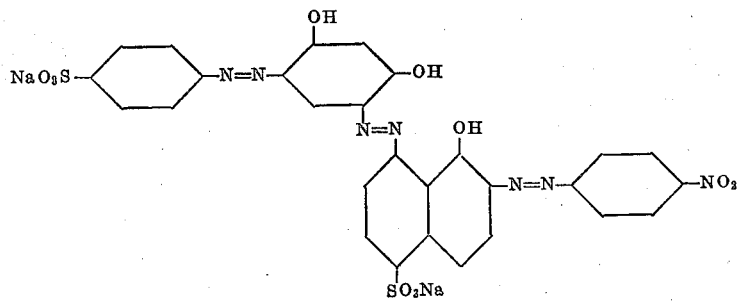

Similar valuable dyestuffs are obtained by substituting for the sulfanilic acid the 6-chloro-2-toluidine-4-sulfonic acid, 6-chloro-3-toluidine-4-sulfonic acid or one of their isomerides, and for the 1-amino-8-naphthol-4-sulfonic acid 1-amino-8-hydroxynaphthalene-3.6-disulfonic acid or 1-amino-8-hydroxynaphthalene-4.6-disulfonic acid.

For the p-nitraniline may be substituted m-nitraniline, m-nitro-p-toluidine, 4-chloro-2-anisidine or the like in which cases there are also obtained valuable dyestuffs for dyeing leather.

2. Dark-brown for leather.

19,9 kilos of picramic acid are diazotized in the usual manner and coupled on 11,0 kilos of resorcinol dissolved with 8,0 kilos of caustic soda solution. The mass is stirred for 5 hours and there are then added in the usual manner 34,1 kilos of diazotized 1-amino-8-hydroxynaphthalene-3.6-disulfonic acid. After the coupling is complete, an acetic acid solution of 13,8 kilos of 4-nitro-1-diazobenzene is run into the mass, and after the coupling is complete, it is salted out in the usual manner.

A dyestuff is obtained with a good yield which dyes leather tanned with a vegetable agent or with chromium deep chocolate-brown tints.

The dyestuff has the following formula:

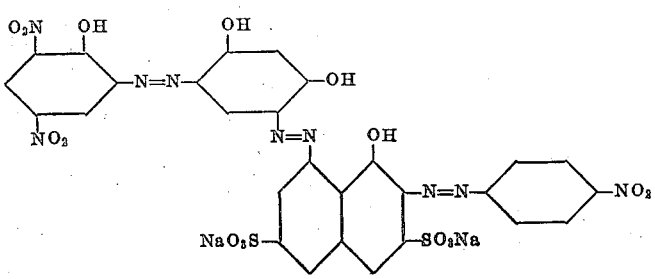

I claim:

1. The process of producing brown trisazodyestuffs consisting in synthesizing trisazodyestuffs according to the following scheme:

an amine ▷ a resorcinol ◁ an aminonaphthol ◁ an amine.

2. The process of producing brown trisazodyestuffs, consisting in coupling with a resorcinol a diazo compound and a diazo naphthol, and then uniting a further diazo compound with the disazo dyestuff thus obtained.

3. The process of producing brown trisazo dyestuffs consisting in coupling with a resorcinol a diazotized aniline and a diazonaphthol, and then uniting a further diazo compound with the disazo dyestuff thus obtained.

4. The process of producing brown trisazo dyestuffs, consisting in coupling with a resorcinol a diazobenzene sulfonic acid and a diazonaphtholsulfonic acid, and then uniting a further diazo compound with the disazo dyestuff thus obtained.

5. The process of producing brown trisazo dyestuffs, consisting in coupling with a resorcinol a diazobenzenesulfonic acid and a diazonaphthol, and then uniting a diazo benzene with the disazo dyestuff thus obtained.

6. The process of producing brown trisazo dyestuffs, consisting in coupling with a resorcinol a diazobenzenesulfonic acid and a diazonaphtholsulfonic acid, and uniting a diazobenzene with the disazo dyestuff thus obtained.

7. The process of producing brown trisazo dyestuffs, consisting in coupling with a resorcinol a diazobenzenesulfonic acid and a diazonaphtholsulfonic acid, and uniting a nitrodiazobenzene with the disazo dyestuff thus obtained.

8. As new products, the trisazo dyestuffs of the scheme

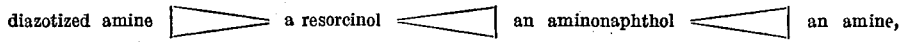

being dark-brown powders, readily soluble in water, also soluble in concentrated sulfuric acid with a dark-brown color, insoluble in most of the organic solvents, dyeing leather from an acid bath dark brown tints.

9. As new products, the trisazo dyestuffs of the following formula:

$$R_1-N=N-R_2-N=N-R_3-N=N-R_4,$$

$R_1$ and $R_4$ designating an aromatic residue, $R_2$ designating resorcinol and $R_3$ designating an aminophenol, being dark-brown powders, readily soluble in water, also soluble in concentrated sulfuric acid with a dark-brown color, insoluble in most of the organic solvents, dyeing leather from an acid bath dark-brown tints.

10. As new products, the trisazo dyestuffs of the following formula:

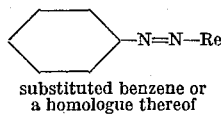—N=N—Resorcinol—N=N—aminonaphtholsulfonic acid—N=N—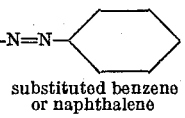

substituted benzene or a homologue thereof    substituted benzene or naphthalene being dark brown powders, readily soluble in water, also soluble in concentrated sulfuric acid with a dark-brown color, insoluble in most of the organic solvents, dyeing leather from an acid bath dark-brown tints.

11. As new products the disazo dyestuffs of the following formula:

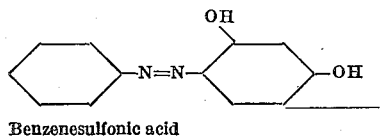—N=N—aminonaphtholsulfonic acid—N=N—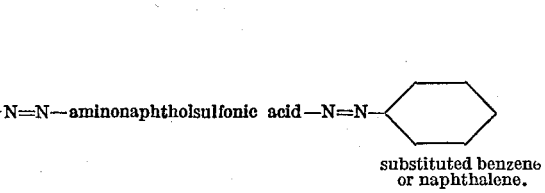

Benzenesulfonic acid    substituted benzene or naphthalene.

being dark-brown powders, readily soluble in water, also soluble in concentrated sulfuric acid with a dark-brown color, insoluble in most of the organic solvents, dyeing leather from an acid bath dark-brown tints.

In testimony whereof, I affix my signature.

BARTHOLOMÄUS VOSSEN.